US010461562B2

(12) United States Patent
Wienhold et al.

(10) Patent No.: US 10,461,562 B2
(45) Date of Patent: Oct. 29, 2019

(54) FIELD DEVICE CHARGING POWER REGULATION

(71) Applicant: Rosemount Inc., Shakopee, MN (US)

(72) Inventors: Nicholas Aaron Wienhold, Waconia, MN (US); Matthew David Wyman, Norwood Young America, MN (US); Andrew James Bronczyk, Cologne, MN (US)

(73) Assignee: ROSEMOUNT INC., Shakopee, MN (US)

( * ) Notice: Subject to any disclaimer, the term of this patent is extended or adjusted under 35 U.S.C. 154(b) by 67 days.

(21) Appl. No.: 15/634,339

(22) Filed: Jun. 27, 2017

(65) Prior Publication Data

US 2018/0375363 A1    Dec. 27, 2018

(51) Int. Cl.
| | |
|---|---|
| H01M 6/50 | (2006.01) |
| H02J 7/00 | (2006.01) |
| G05F 1/613 | (2006.01) |
| H02J 7/34 | (2006.01) |
| G05B 19/042 | (2006.01) |

(52) U.S. Cl.
CPC .......... *H02J 7/0081* (2013.01); *G05B 19/042* (2013.01); *G05F 1/613* (2013.01); *H02J 7/34* (2013.01); *H02J 7/345* (2013.01); *G05B 2219/25428* (2013.01)

(58) Field of Classification Search
CPC ....... Y02E 60/12; H02J 7/0042; H02J 7/0045; H01M 10/46; H01M 10/44
USPC ......................................................... 320/107
See application file for complete search history.

(56) References Cited

U.S. PATENT DOCUMENTS

| | | | |
|---|---|---|---|
| 6,504,489 B1 | 1/2003 | Westfield et al. | |
| 7,962,100 B2 | 6/2011 | Isenmann et al. | |
| 8,102,278 B2 | 1/2012 | Deck et al. | |
| 8,150,462 B2 | 4/2012 | Guenter et al. | |
| 8,160,535 B2 | 4/2012 | Kielb et al. | |
| 8,847,571 B2 | 9/2014 | Kielb | |
| 9,094,536 B2 | 7/2015 | Allgaier | |
| 2004/0020528 A1* | 2/2004 | Patwardhan | F03G 6/04 |
| | | | 136/244 |
| 2006/0042683 A1* | 3/2006 | Gangemi | H01L 31/02008 |
| | | | 136/252 |

(Continued)

FOREIGN PATENT DOCUMENTS

EP    2 569 675    9/2014

OTHER PUBLICATIONS

Operating Instructions, Display and Adjustment Module PLICSCOM, VEGA Grieshaber KG, 2018.
Notification of Transmittal of the International Search Report and the Written Opinion of the International Searching Authority from PCT/US2018/027219, dated Jul. 12, 2018.

(Continued)

*Primary Examiner* — Arun C Williams
(74) *Attorney, Agent, or Firm* — Westman, Champlin & Koehler, P.A.

(57) ABSTRACT

A field device for an industrial process includes device circuitry, a shunt circuit, a bulk supply a charging power regulator and a supplemental circuit. The device circuitry is configured to receive power and communicate data over a two-wire process control loop. The shunt circuit is configured to shunt an unused portion of the power to an electrical ground. The charging power regulator is configured to regulate an excess portion of the power to charge the bulk supply based on the unused portion. The supplemental circuit is powered by the bulk supply.

20 Claims, 3 Drawing Sheets

(56) References Cited

U.S. PATENT DOCUMENTS

| | | | |
|---|---|---|---|
| 2006/0161359 A1* | 7/2006 | Lalla | G01D 9/005 |
| | | | 702/65 |
| 2006/0290328 A1 | 12/2006 | Orth | |
| 2008/0083446 A1* | 4/2008 | Chakraborty | H01L 35/00 |
| | | | 136/205 |
| 2009/0253388 A1 | 10/2009 | Kielb et al. | |
| 2010/0023337 A1* | 1/2010 | Case | G06Q 30/00 |
| | | | 705/1.1 |
| 2011/0202910 A1* | 8/2011 | Venkatakrishnan | G06Q 10/06 |
| | | | 717/171 |
| 2012/0005489 A9 | 1/2012 | Allgaier et al. | |
| 2012/0175876 A1* | 7/2012 | Pendray | F02D 19/02 |
| | | | 290/41 |
| 2013/0199516 A1* | 8/2013 | Snyder | F24D 5/12 |
| | | | 126/633 |
| 2014/0106687 A1 | 4/2014 | Allgaier | |
| 2017/0229904 A1 | 8/2017 | Allgaier et al. | |

OTHER PUBLICATIONS

Specification Sheet PLICSCOM "Pluggable Display and Adjustment Module for PLICS® Sensors", VEGA, no date, 2 pgs.
Product Information Indication and Adjustment, Display and Adjustment Instruments, VEGA, Document ID: 30143, 2017, 12 pgs.
Software and Display Instruments, no date, pp. 50-53.
Specification Sheet VEGADIS 81, "External Display and Adjustment Unit for PLICS® Sensors", VEGA, no date, 2 pgs.
Operating Instructions, "External Display and Adjustment Unit for PLICS® Sensors", VEGA, Document ID: 43814, 2017, 43 pgs.
Operating Instructions, "Electronics Module", VEGA, Document ID: 49685, 2015, 12 pgs.
Supplementary Instructions, "VEGADIS Adapter", VEGA, Document ID: 45250, 2018, 12 pgs.
Supplementary Instructions, "PA/FF Adapter Kit for VEGADIS 61 and 81", VEGA, Document ID: 33959, 2016, 8 pgs.

\* cited by examiner

FIELD DEVICE CHARGING POWER REGULATION

FIELD

Embodiments of the present disclosure relate to industrial process control or monitoring systems. More specifically, embodiments of the present disclosure relate to the regulation of charging power in a field device for powering a supplemental circuit.

BACKGROUND

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices currently known, or yet to be known, that are used in the measurement, control, and/or monitoring of industrial processes.

Typical field devices include device circuitry that enables the field device to perform conventional field device tasks such as process parameter monitoring and measurements using one or more sensors, and/or process control operations using one or more control elements. Exemplary sensors include pressure sensors, flow sensors, level sensors, temperature sensors, and other sensors used in industrial processes. Exemplary control elements include actuators, solenoids, valves, and other control elements.

The device circuitry of field devices may also include a controller that is used to control the sensors and/or control elements, and communicate with a process control room, or other circuitry, over a process control loop, such as a 4-20 mA process control loop, for example. In some installations, the process control loop is used to deliver a regulated current and/or voltage to the field device for powering the field device. The process control loop can also carry data, such as a process parameter value corresponding to a sensed process parameter. This data may be communicated over the process control loop as an analog signal, or as a digital signal.

When the field device is powered by the process control loop, it is typically designed to consume very little power. In order to provide other operations beyond those typically provided by the device circuitry, such as wireless data communications or flash writes, for example, field devices commonly have either a supplemental power supply, such as solar panels, or a bulk supply circuit (e.g., a battery or capacitor), that can power the circuitry that is used to perform such operations.

Bulk supply circuits in conventional field devices are conventionally trickle charged until they are capable of providing sufficient current to power the circuitry that is used to perform the operation. The trickle charging is set very slow to ensure that the device circuitry always has sufficient power to perform its process parameter monitoring or measuring, and/or process control functions. For example, when the bulk supply circuit is configured to charge a capacitor, the charging circuit is forced to have a fixed and long time constant to charge the capacitor that is limited to the worst-case power budget for the device circuitry. As a result, the bulk supply is charged very slowly even when excess power from the control loop is available that would allow for faster charging rates. Additionally, the frequency at which the field device can perform high-power operations is very low.

The low frequency at which supplemental operations may be performed can be problematic when it is necessary to perform several operations to complete a desired task, such as a wireless data communication. For example, due to the limited power available, a single wireless data communication may only transmit a small amount of data. Thus, for larger data amounts, it is necessary to perform several cycles of charging the bulk supply circuit, and discharging the bulk supply circuit to power the wireless communication circuitry. Due to the slow charging of the bulk supply circuit and the resultant low frequency at which the operations can be performed, a significant amount of time may be required to perform the data communication.

SUMMARY

Embodiments of the present disclosure are directed to a field device for an industrial process that is configured to regulate the charging of a bulk supply used to power a supplemental circuit. Additional embodiments are directed to a method of operating the field device.

One embodiment of the field device includes device circuitry, a shunt circuit, a bulk supply a charging power regulator and a supplemental circuit. The device circuitry is configured to receive power and communicate data over a two-wire process control loop. The shunt circuit is configured to shunt an unused portion of the power to an electrical ground. The charging power regulator is configured to regulate an excess portion of the power to charge the bulk supply based on the unused portion. The supplemental circuit is powered by the bulk supply.

Embodiments of the method are directed to operating a field device for an industrial process that includes device circuitry, a shunt circuit, a bulk supply, a charging power regulator, and a supplemental circuit. In one embodiment of the method, power is received and data is communicated over a two-wire process control loop using the device circuitry. An unused portion of the power is shunted to an electrical ground using the shunt circuit. An excess portion of the power is regulated to charge the bulk supply based on the unused portion using the charging power regulator. The supplemental circuit is powered using the bulk supply.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

Computer program or software aspects of embodiments of the present disclosure may comprise computer readable instructions or code stored in a computer readable medium or memory. Execution of the program instructions by one or more processors (e.g., central processing unit or controller) results in the one or more processors performing one or more functions or method steps described herein. Any suitable patent subject matter eligible computer readable media or memory may be utilized. Such computer readable media or memory do not include transitory waves or signals.

Embodiments of the present disclosure may also be described using flowchart illustrations and block diagrams. Although a flowchart or block diagram may describe the operations as a sequential process, many of the operations can be performed in parallel or concurrently. In addition, the order of the operations may be re-arranged. A process is terminated when its operations are completed, but could have additional steps not included in a figure or described herein.

Figure 1:
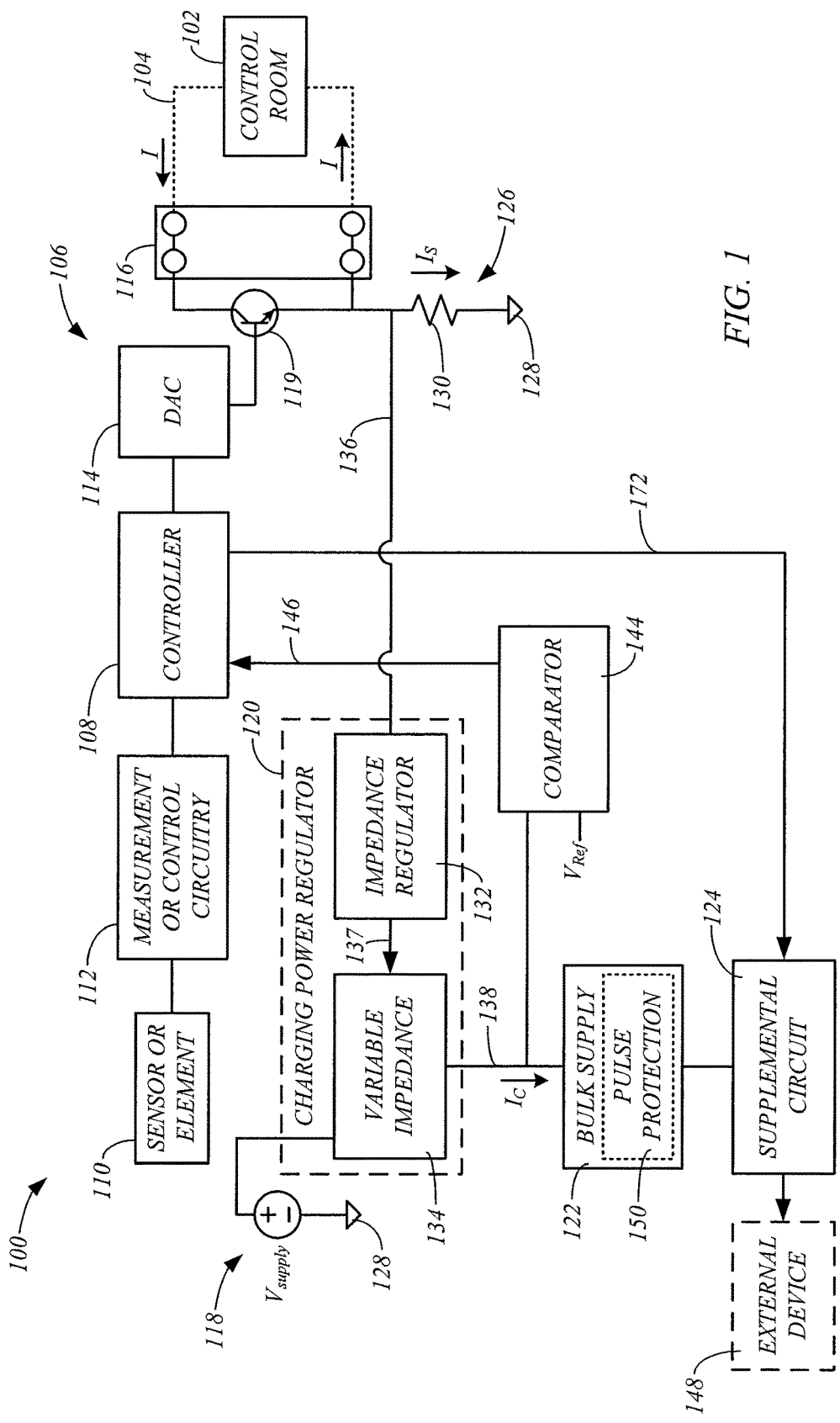
FIG. 1 is a simplified block diagram of an exemplary field device coupled to a two-wire process control loop, in accordance with embodiments of the present disclosure.

Embodiments of the present disclosure are generally directed to a field device for an industrial process and a method of using the field device. FIG. 1 is a simplified block diagram of an exemplary field device 100 in accordance with embodiments of the present disclosure. The field device 100 is coupled to a control room 102 over a two-wire process control loop 104.

In some embodiments, the field device 100 includes device circuitry 106, which may include conventional field device components, such as a controller 108, one or more sensors or control elements 110, measurement or control circuitry 112, a digital-to-analog converter (DAC) 114, a terminal block 116, and/or power supply circuitry 118, for example. The sensors or control elements 110 may also be separate from the device circuitry 106 and physically separate from the device 100. The control room 102 includes a power source that powers the field device 100 over the process control loop 104 through the terminal block 116. The power supply circuitry 118 regulates the power received from the process control loop 104 to supply components of the field device 100 with electrical power.

Communications between the control room 102 and the field device 100 may be performed over the control loop 104 in accordance with conventional analog and/or digital communication protocols. In some embodiments, the process control loop 104 includes a 4-20 milliamp process control loop, in which a process variable may be represented by a level of a loop current I flowing through the process control loop 104. Exemplary digital communication techniques include digital signals that are modulated onto the analog current level of the two-wire process control loop 104, such as the HART® communication standard. Other purely digital techniques may also be employed including Foundation® FieldBus and Profibus communication protocols. Suitable communications circuitry for the field device 100 may be represented by the controller 108 and the DAC 114, for example.

The field device 100 is generally located remotely from the control room 102 and may be coupled to an industrial process (not shown), such as a pipe, a tank, or another industrial process. The field device 100 may be used to sense or measure a parameter of the process, such as a temperature, a level, a pressure, a flow rate, or another parameter of the process using the one or more sensors represented by box 110. Exemplary sensors 110 include pressure sensors, temperature sensors, level sensors, flow rate sensors, and/or other sensors used to sense or measure a process parameter. The field device 100 may also be configured to control an aspect of the process using one or more control elements represented by box 110. Exemplary control elements 110 include actuators, solenoids, valves, and other conventional process control elements used in field devices to control a process.

The measurement or control circuitry 112 represents circuitry that interacts with the sensor or control element 110. For instance, the circuitry 112 may include measurement circuitry that translates an output from a sensor for use by the controller 108. The circuitry 112 may also be used to control the control element in response to signals received from the controller 108. The DAC 114 may be used by the controller 108 to convert digital signals into analog signals that are communicated to the control room 102 over the two-wire process control loop 104, such as by adjusting the loop current I to indicate a value of a process parameter sensed by the sensor 110 through the control of an NPN transistor 119, for example.

The controller 108 may represent one or more processors (i.e., microprocessor, central processing unit, etc.) that control components of the field device 100 to perform one or more functions described herein in response to the execution of instructions, which may be stored locally in patent subject matter eligible computer readable media or memory of the device 100. In some embodiments, the processors of the controller 108 are components of one or more computer-based systems. In some embodiments, the controller 108 includes one or more control circuits, microprocessor-based engine control systems, one or more programmable hardware components, such as a field programmable gate array (FPGA), that are used to control components of the device 100 to perform one or more functions described herein. As discussed above, the controller 108 may also represent communications circuitry, and/or other conventional field device circuitry.

As discussed below in greater detail, embodiments of the present disclosure relate to improving the powering of supplemental circuitry that is generally not a component of the device circuitry 106, and that is configured to perform operations for the field device 100. These operations may include data communications that are not conducted over the two-wire process control loop 104, such as wired or wireless data communications, and data writing operations to memory (e.g., flash memory), for example.

In some embodiments, the field device 100 includes a charging power regulator 120, a bulk supply 122, and a supplemental circuit 124. In some embodiments, the field device 100 improves the powering of the supplemental circuit 124 by regulating the charging of the bulk supply 122 based on the availability of an excess portion of the power that is received from the control room 102 over the two-wire process control loop 104. The excess portion of the power relates to power that would otherwise be unused by the device 100, such as the device circuitry 106.

In some embodiments, the device 100 includes a shunt circuit 126 that is configured to shunt an unused portion of the power received by the device 100 over the process control loop 104 to electrical ground 128. In some embodiments, the shunt circuit 126 includes a resistance 130 through which a shunt current $I_S$ delivered to ground 128. The shunt current $I_S$ through the resistance 130 and a shunt voltage across the resistance 130 correspond to the unused portion of the power received by the device 100 over the process control loop 104. Other techniques for determining the unused portion of the power may also be used.

In some embodiments, the charging power regulator 120 includes an impedance regulator 132 and a variable impedance 134. The impedance regulator 132 is configured to adjust the variable impedance 134 to regulate the excess portion of the power that is used to charge the bulk supply 122 based on the unused portion of the power. In some embodiments, the impedance regulator 132 receives the shunt voltage across the resistance 130 as an input over line 136, which indicates the unused portion of the power, and produces a control signal 137 based on the input.

The variable impedance 134 controls the excess portion of the power that is delivered to the bulk supply 122 over line 138 from a supply voltage ($V_{supply}$) provided by the power supply circuitry 118 in response to the control signal 137 from the impedance regulator 132. Thus, depending upon the magnitude of the unused portion of the power indicated on line 136, the impedance regulator 132 varies the variable impedance 134 to control the current over line 138 that charges the bulk supply 122.

In some embodiments, the variable impedance 134 controls a time constant associated with the bulk supply 122, such as when the bulk supply 122 includes a bulk capacitor, for example. As the variable impedance 134 is reduced in response to an increase in the detected unused portion of the power, the time constant is reduced. This increases the speed at which the bulk supply 122 may be charged, thereby allowing the device 100 to take advantage of the excess power that would otherwise be shunted to ground 128. Furthermore, this higher charging rate also allows the supplemental circuit 124 to perform its operations at a higher frequency. When the variable impedance 134 is increased, such as during a decrease in the unused portion of the power, the time constant associated with the bulk supply 122 increases, thereby slowing the consumption of excess power by the bulk supply 122 when more power is required by other components of the device 100, such as the device circuitry 106, for example.

In some embodiments, the device 100 includes a comparator 144 that is used to determine when the bulk supply 122 has reached a threshold charge or voltage level, which may be required for the supplemental circuit to perform an operation. In some embodiments, the comparator 144 receives a voltage input at line 138 and a reference voltage ($V_{Ref}$) that corresponds to the threshold charge or voltage level. A charge output 146 from the comparator 144 may indicate when the voltage at line 138 reaches the reference voltage. In some embodiments, the controller 108 uses the charge output 146 to determine when the bulk supply 122 is sufficiently charged to power the supplemental circuit 124 to perform a desired operation.

The supplemental circuit 124 may be configured to perform any suitable operation for the field device or an operator of the field device. In some embodiments, the supplemental circuit 124 is configured to perform an operation that is not conventionally performed by the device circuitry 106. Exemplary operations that may be performed by the supplemental circuit 124 include data communications with an external device 148. In some embodiments, the data communications include a wired or wireless data communication with the device 148, a wireless data communication performed in accordance with a Bluetooth protocol with the device 148, a data writing operation with the device 148 (e.g., flash memory), or other data communication with the device 148. The device 148 may represent a user-operated controller, a mobile computing device, a router, another field device, such as a field device that is not connected to the two-wire process control loop 104, or another device. Other exemplary operations that the supplemental circuit 124 may be configured to perform include heating a portion of the field device, displaying information (e.g., on the device 148), transmitting audible and/or visible signals, and/or another operation.

In some embodiments, the bulk supply 122 includes pulse protection circuitry 150. The pulse protection circuitry 150 operates to dampen transient current pulses that could potentially damage the power supply circuitry 118 and/or the supplemental circuit 124, for example.

Figure 2:
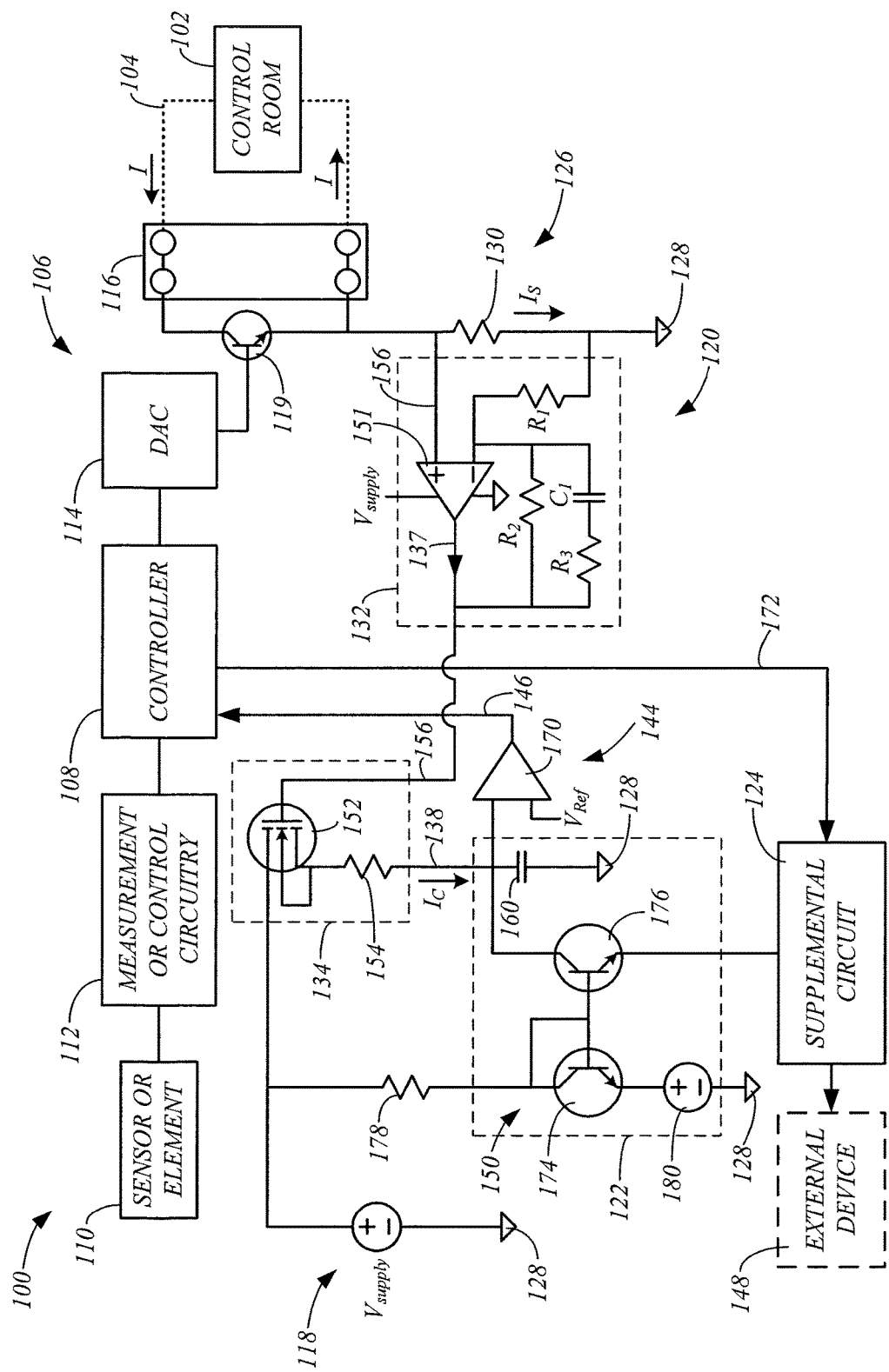
FIG. 2 is an exemplary circuit diagram of the field device of FIG. 1, in accordance with embodiments of the present disclosure.

FIG. 2 is an exemplary circuit diagram of the field device of FIG. 1, in accordance with embodiments of the present disclosure. FIG. 2 illustrates exemplary circuitry forming the impedance regulator 132, the variable impedance 134, the bulk supply 122, the pulse protection circuitry 150, and the comparator 144. It is understood that the exemplary circuits are merely one of many options that may be implemented to perform the functions of these components. Details of conventional field device components that aren't directly relevant to embodiments of the present disclosure are not illustrated in FIG. 2.

One exemplary embodiment of the impedance regulator 132 of the charging power regulator 120 is in the form of a low-pass filter that includes an operational amplifier 151 that receives the shunt voltage across the resistance 130 as an input across its positive and negative input terminals. The control signal 137 from the op-amp 151 increases with an increasing value of the shunt current ($I_S$) and the shunt voltage across the resistance 130. In some embodiments, the impedance regulator 132 includes a resistor $R_1$ coupled between electrical ground 128 and the negative input terminal of the op-amp 151, a resistor $R_2$ connected between the negative input terminal and the output of the op-amp 151, and a resistor $R_3$ and a capacitor $C_1$ connected in parallel with the resistor $R_2$. In accordance with some exemplary embodiments, the resistor $R_1$ is 1 kΩ, $R_2$ is 178 kΩ, $R_3$ is 301 kΩ, and $C_1$ is 0.033 µF. Other circuits that perform the function of the impedance regulator 132 may also be used.

In one exemplary embodiment, the variable impedance 134 of the charging power regulator 120 includes an n-channel MOSFET 152 and a resistance 154, as shown in FIG. 2. The control signal 137 output from the impedance regulator 132 is coupled to the gate of the MOSFET 152 through line 156. The supply voltage $V_{supply}$ generated by the power supply circuit 118 is electrically coupled to the drain of the MOSFET 152, and the source of the MOSFET 152 is electrically coupled to the bulk supply 122 through the resistance 154. The resistance 154 may be 500Ω, for example.

As the unused power indicated by the shunt voltage increases, the control signal 137 from the impedance regulator 132 increases, and the impedance through the MOSFET 152 decreases due to the increasing positive voltage drop between the gate and the source of the MOSFET 152. This causes an increase in the charging current $I_c$ that travels from the power supply circuit 118 to the bulk supply 122, and an increase in the rate at which the bulk supply 122 is charged. As the control signal 137 from the impedance regulator 132 drops in voltage due to a decreasing shunt voltage, the impedance through the MOSFET 152 increases due to the decreasing positive voltage drop between the gate and the source of the MOSFET 152, resulting in a reduction to the charging current $I_c$. Thus, this causes a decrease in the rate at which the bulk supply 122 is charged. When the shunt voltage is very low or zero, the voltage of the control signal 137 from the impedance regulator 132 is insufficient to activate the MOSFET 152. Thus, the MOSFET 152 acts as an open circuit and terminates the charging current $I_c$ and the charging of the bulk supply 122. Accordingly, the impedance regulator 132 and the variable impedance 134 of the charging power regulator 120 operate to control the charging of the bulk supply 122 based on the unused portion of the power received by the device 100 over the process control loop 104.

In some embodiments, the bulk supply 122 includes a bulk capacitor 160 (e.g., 68 μF) that is charged by the charging current $I_c$. Alternatively, the bulk supply 122 may comprise a rechargeable battery that is charged by the charging current $I_c$.

When the bulk supply 122 utilizes the bulk capacitor 160, the bulk capacitor 160 has an associated time constant that is based on the variable impedance 134. As a result, the impedance regulator 132 controls the time constant of the bulk capacitor 160 by regulating the variable impedance 134 based on the unused portion of the power received by the device 100 over the process control loop 104. As the impedance through the MOSFET 152 decreases in response to an increasing unused portion of the power, the time constant associated with the capacitor 160 decreases. This allows the bulk capacitor 160 to be charged more quickly to make use of the available excess portion of the power. However, as the impedance regulator 132 increases the impedance across the MOSFET 152 in response to a decrease in the unused portion of the power received by the device 100, the time constant associated with the capacitor 160 increases, which slows the rate at which the bulk capacitor 160 is charged. As a result, the bulk capacitor 160 charges more slowly or not at all when there is little unused power and, thus, little excess power available to the charging power regulator 120.

One exemplary comparator 144 includes an operational amplifier 170 that receives the voltage at line 138, which is indicative of the charge level of the bulk supply 122, and a reference voltage at its inputs, and produces the charge level output 146 based on the difference. The charge level output 146 is fed to the controller 108. In some embodiments, when the output 146 from the operational amplifier 170 indicates that the voltage at line 138 or the charge level of the bulk supply 122 (e.g., the bulk capacitor 160), is less than the reference voltage, the controller 108 withholds activation of the supplemental circuit 124. When the output from the operational amplifier 170 indicates that the bulk capacitor 160 has a charge that meets or exceeds the reference voltage, the controller 108 may activate the supplemental circuit 124 to perform an operation, such as one or more of the operations discussed above, through a signal over line 172.

As mentioned above, the bulk supply 122 may include a pulse protection circuit 150 that operates to dampen transient current pulses that may otherwise occur in response to activation of the supplemental circuit 124. In one exemplary embodiment, the pulse protection circuit 150 includes a pair of NPN transistors 174 and 176 having connected bases, as shown in FIG. 2. The emitter of the transistor 174 is coupled to the supply voltage $V_{supply}$ through a resistance 178, and its collector is coupled to its base. Transistor 176 is coupled to line 138. A voltage supply 180 is coupled between the emitter of the transistor 174 and electrical ground 128.

In operation, the controller 108 activates the supplemental circuit 124 when the charge on the bulk capacitor 160 has reached or exceeded a threshold charge ($V_{Ref}$). This allows current to flow from the bulk capacitor 160 through the transistor 176 and to the supplemental circuit 124 to power the supplemental circuit 124. During the performance of an operation by the supplemental circuit 124, the pulse protection circuit 150 prevents the power supply circuit 118 from encountering potentially harmful transient current pulses.

Figure 3:
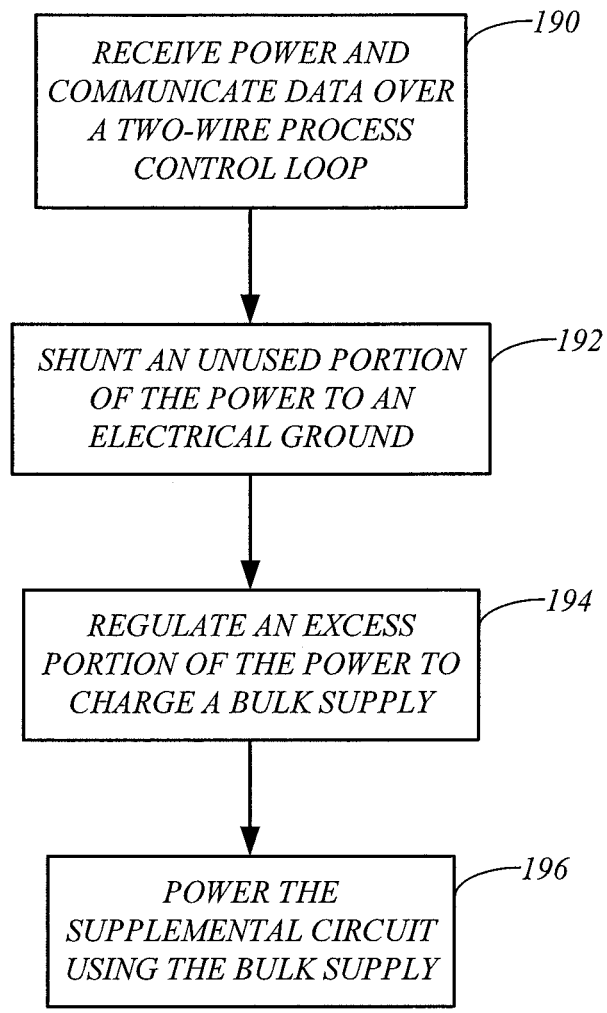
FIG. 3 is a flowchart illustrating a method of operating a field device, in accordance with embodiments of the present disclosure.

FIG. 3 is a flowchart illustrating a method of using the field device 100, in accordance with embodiments of the present disclosure. At 190 of the method, the field device 100 (FIGS. 1 and 2) receives power and may communicate data over a two-wire process control loop 104. The power received over the process control loop 104 is used to power the circuitry of the device 100. Some of this power is represented by the power supply circuitry 118. The device 100 may control the loop current I traveling through the process control loop 104 using the controller 108 and the DAC 114, for example, to communicate a process variable measurement to the control room 102.

At 192, an unused portion of the power received by the device 100 over the process control loop 104 is shunted to electrical ground 128 using a shunt circuit 126. As discussed above, the shunt circuit 126 may include a resistance 130 through which the shunt current $I_s$, which corresponds to the unused portion of the power, is delivered to electrical ground 128. A shunt voltage across the resistance 130 due to the shunt current $I_s$ also corresponds to the unused portion of the power.

At 194 of the method, an excess portion of the power is regulated to charge a bulk supply 122 based on the unused portion of the power using a charging power regulator 120. Embodiments of the charging power regulator 120 include an impedance regulator 132 and a variable impedance 134, as discussed above. In some embodiments, the variable impedance 134 connects the supply voltage $V_{supply}$ to the bulk supply 122. The excess portion of the power that is delivered to the bulk supply 122 varies based on the variable impedance 134, and is regulated using the impedance regulator 132 by adjusting the variable impedance 134 based on the unused portion of the power, such as that indicated by the shunt voltage across the resistance 130, for example. In some embodiments, the impedance regulator 132 produces a control signal 137 based on the shunt voltage, and the variable impedance 134 is adjusted in response to the control signal 137.

The bulk supply 122 may include a capacitor 160 (FIG. 2) having an associated time constant. The excess portion of the power is regulated by the charging power regulator 120 by controlling the time constant using the impedance regulator 132 based on the unused portion of the power, such as that indicated by the shunt voltage.

At 196 of the method, the supplemental circuit 124 is powered using the bulk supply 122. In some embodiments, this involves the activation of the supplemental circuit 124 by the controller 108. The activation of the supplemental circuit 124 by the controller 108 may be performed based on a charge output 146 from a comparator 144 that indicates the charge level of the bulk supply 122, as discussed above.

In some embodiments, the activation of the supplemental circuit 124 results in the performance of an operation by the supplemental circuit 124. In some embodiments, the operation performed by the supplemental circuit 124 involves one or more of the operations discussed above. In one embodiment, the operation performed by the supplemental circuit 124 includes a wireless data communication to an external device 148 in accordance with a Bluetooth communication protocol.

In some embodiments, the field device includes a sensor or control element 110 and measurement or control circuitry 112. In some embodiments, the field device 100 senses a process parameter using the sensor 110 and the measurement or control circuitry 112, and/or controls a control element 110 using the measurement or control circuitry 112.

Although the embodiments of the present disclosure have been described with reference to preferred embodiments, workers skilled in the art will recognize that changes may be made in form and detail without departing from the spirit and scope of the present disclosure.

What is claimed is:

1. A field device for an industrial process comprising:
   device circuitry configured to receive power and communicate data over a two-wire process control loop;
   a shunt circuit configured to shunt an unused portion of the power to an electrical ground;
   a bulk supply;
   a charging power regulator configured to regulate an excess portion of the power to charge the bulk supply based on a magnitude of the unused portion; and
   a supplemental circuit powered by the bulk supply.

2. The device according to claim 1, wherein the charging power regulator comprises:
   a variable impedance connecting a supply voltage to the bulk supply, wherein the excess portion of the power delivered to the bulk supply varies based on the variable impedance; and
   an impedance regulator configured to adjust the variable impedance to regulate the excess portion of the power based on the unused portion.

3. The device according to claim 2, wherein:
   the shunt circuit comprises a resistance; and
   the impedance regulator adjusts the variable impedance based on a voltage drop across the resistance.

4. The device according to claim 3, wherein:
   the impedance regulator outputs a control signal based on the voltage drop across the resistance; and
   the variable impedance includes a transistor that adjusts the variable impedance based on the control signal.

5. The device according to claim 2, wherein:
   the bulk supply comprises a capacitor having an associated time constant; and
   the impedance regulator controls the time constant based on the unused portion of the power.

6. The device according to claim 1, wherein the bulk supply comprises a battery.

7. The device according to claim 1, further comprising a comparator having a charge output indicating an electrical charge of the bulk supply, wherein a controller of the device circuitry controls an activation of the supplemental circuit based on the charge output.

8. The device according to claim 1, further comprising at least one of:
   a sensor configured to sense a process parameter; and
   a control element configured to control a process.

9. The device according to claim 8, wherein the device circuitry comprises at least one of:
   measurement circuitry configured to process an output from the sensor indicative of the process parameter; and
   control circuitry configured to control the control element.

10. The device according to claim 1, wherein the supplemental circuit is configured to communicate data to an external device.

11. The device according to claim 10, wherein the supplemental circuit is configured to communicate data to the external device in accordance with a Bluetooth communication protocol.

12. A method of operating a field device for an industrial process, the field device including device circuitry, a shunt circuit, a bulk supply, a charging power regulator, and a supplemental circuit, the method comprising:
   receiving power and communicating data over a two-wire process control loop using the device circuitry;
   shunting an unused portion of the power to an electrical ground using the shunt circuit;
   regulating an excess portion of the power to charge the bulk supply based on a magnitude of the unused portion using the charging power regulator; and
   powering the supplemental circuit using the bulk supply.

13. The method according to claim 12, wherein:
   the charging power regulator comprises:
      a variable impedance connecting a supply voltage to the bulk supply, wherein the excess portion of the power delivered to the bulk supply varies based on the variable impedance; and
      an impedance regulator; and
   regulating the excess portion of the power comprises adjusting the variable impedance using the impedance regulator based on the unused portion of the power.

14. The method according to claim 13, wherein:
   the shunt circuit comprises a resistance; and
   the method includes sensing the unused portion of the power comprising sensing a voltage drop across the resistance; and
   adjusting the variable impedance comprises adjusting the variable impedance based the sensed voltage drop.

15. The method according to claim 14, wherein:
   outputting a control signal using the impedance regulator based on the sensed voltage drop; and
   adjusting the variable impedance comprises:
      communicating the control signal to a transistor of the variable impedance; and
      adjusting the variable impedance based on the control signal.

16. The method according to claim 13, wherein:
   the bulk supply comprises a capacitor having an associated time constant; and
   regulating the excess portion of the power comprises controlling the time constant using the impedance regulator based on the unused portion of the power.

17. The method according to claim 12, further comprising:
  sensing an electrical charge of the bulk supply; and
  controlling an activation of the supplemental circuit based on the sensed electrical charge using a controller of the device circuitry.

18. The method according to claim 12, further comprising performing at least one of:
  sensing a process parameter using a sensor; and
  controlling a process using a control element.

19. The method according to claim 12, further comprising communicating data to an external device using the supplemental circuit.

20. The method according to claim 18, wherein communicating data to the external device comprises communicating data to the external device in accordance with a Bluetooth communication protocol.

* * * * *